Figure 1:
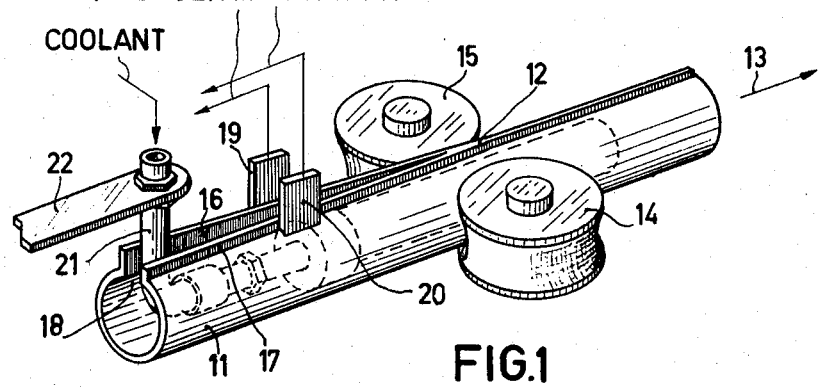

Sept. 28, 1965   D. C. VAN IPEREN   3,209,115
DEVICE FOR USE IN ELECTRIC WELDING OF THE EDGES
OF THE LONGITUDINAL SEAM IN A METAL TUBE
Filed March 17, 1964

INVENTOR.
DIRK C. VAN IPEREN
BY
AGENT

United States Patent Office 3,209,115
Patented Sept. 28, 1965

3,209,115
DEVICE FOR USE IN ELECTRIC WELDING OF THE EDGES OF THE LONGITUDINAL SEAM IN A METAL TUBE
Dirk Christian van Iperen, Emmasingel, Eindhoven, Netherlands, assignor to North American Philips Company, Inc., New York, N.Y., a corporation of Delaware
Filed Mar. 17, 1964, Ser. No. 352,557
Claims priority, application Netherlands, Mar. 18, 1963, 290,357
11 Claims. (Cl. 219—59)

The invention relates to a device for use in electric welding of the edges of the longitudinal seam in a metal tube with the use of a high-frequency current supply source and a body or mass of magnetic material mounted in a holder made of non-magnetic material and adapted to pass a coolant.

Methods and apparatus are known for welding together the edges defining the longitudinal seam in metal tubing as the tube is advanced longitudinally while pressure is applied thereto to close the seam at a weld point. The heating of the edges is effected by means of high-frequency current, which is conducted to the metal tubing by the use of electrodes positioned adjacent the seam edges at points shortly in advance of the welding point or by suitably shaped coils producing induction currents in the metal of the tubing upon being traversed by oscillatory current of sufficiently high frequency. As pointed out in the prior disclosures, mounting a magnetic material within the tubing causes the heating current to be concentrated along the seam edges.

In a particular known device, a rod-shaped body of magnetic material is surrounded throughout its length by an envelope of insulating non-magnetic material, enabling a cooling liquid to flow through an interstice between the envelope and the rod. The rod is completely enclosed by a tube of insulating material. In a further known device, another insulation tube is provided as an additional envelope from which a film of liquid is caused to wash away particles of metal and oxides which are deposited on the outer surface of the cooling liquid conducting envelope during welding.

It is an object of the present invention to provide a modified construction of such a device which offers certain advantages.

According to the invention, the body or core of magnetic material is surrounded by a holder shaped in the form of a cage comprising a plurality of pipes which at one end are connected to a connecting piece for the supply of coolant and are provided with perforations or holes for the passage of coolant towards the magnetic material.

This construction has the following advantages:
 (a) The device is mechanically strong;
 (b) Very intense cooling of the magnetic material is obtainable;
 (c) There is no need for additional steps for washing away particles of metal and oxide which may be deposited on the envelope; as a result, the cross-section of the device shows no projections taking up a disproportionate amount of space;
 (d) The likelihood of burning in or off of the head of the device is very slight so that the device can be brought very near to the weld.

The advantages are enhanced by certain embodiments of the invention such as for example, that in which the tubes have closed free ends and converge from the connecting piece for the coolant.

In order that the invention may readily be carried into effect, an embodiment thereof will now be described, by way of example, with reference to the accompanying drawing, in which:
 FIG. 1 is a perspective view showing the general arrangement of a tube welding apparatus,
 FIG. 2 is a longitudinal sectional view of an embodiment of the invention as located in tubing being welded,
 FIG. 3 is a cross-sectional view taken on the line III—III of FIG. 2.

The tube which is to be welded is indicated at 11 advancing in the direction of the arrow 13 shown, through a tube mill which may include a pair of pressure applying rollers 14 and 15 which engage opposite sides of the tubing near the region of the weld-point 12 so that the opposite edges 16 and 17 along the seam 18 are firmly brought together. Radio frequency current is applied to the seam edges by contacts or electrodes 19 and 20 each of which is located slidably to engage adjacent the seam edges a suitable distance in advance of the weld-point 12.

Figure 2:
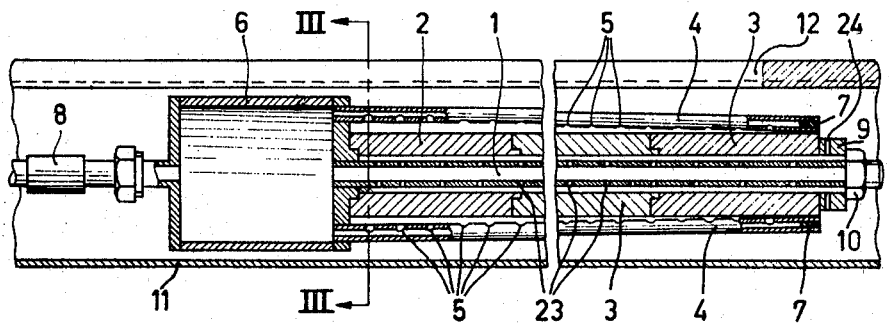
Figure 3:
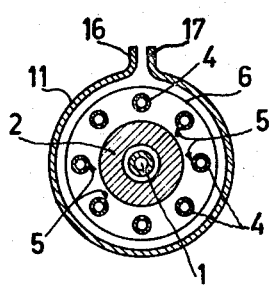

As shown in FIG. 2 and FIG. 3, cylindrical members 2 and 3 of magnetic material are arranged so as to surround a central rod 1. The members 2 and 3 are enclosed in a cage of pipes 4 made of non-magnetic material, such as copper, and provided with holes 5 extending towards the members 2 and 3.

At one end, each pipe 4 is mounted in a common housing 6, for example, firmly secured therein by soldering. The other end of each pipe 4 is free and closed, for example, by a plug 7. The pipes 4 slightly converge to the right-hand side of FIG. 2 so that the members 2 and 3 are held by the pipes 4.

A retaining ring 9 made of heat-resistant ceramic material is pressed against the members 2 and 3 by a nut 10.

The housing 6, which may be made of brass, is provided with a connection 8 for the supply of cooling liquid so that this liquid can flow through the housing 6 and the pipes 4. The liquid flows out through the apertures 5 and strikes the surfaces of the members 2 and 3 so as to cool the latter.

The central rod 1 also is a tube which is closed at one end and is provided with one or more holes 23 which communicate with one or more channels 24 in the ring 9 for internal cooling of the magnetic material.

The assembly of magnetic material and cooling pipes is shown in dotted lines in FIG. 1 and it may be supported as by a tube 21 extending out of the gap 18 and through which the coolant may be introduced. For supporting this tube it is connected to a supporting member 22.

Although in the embodiment described high-frequency current is supplied by electrodes engaging the tubing, it is evident that the invention is also applicable to apparatus using electro-magnetic induction means for generating the current for heating the seam edges.

What is claimed is:
1. A device for welding together the edges of a longitudinal seam in a metal tube by means of a high-frequency current, comprising means for applying said high frequency current to said edges, a core of magnetic material which is arranged in a holder made of non-magnetic material and adapted for passage of a fluid coolant therethrough, a connecting piece for supplying said coolant to said holder, characterized in that the holder is shaped in the form of a cage comprising a plurality of pipes which are connected at one end to said connecting piece for the supply of coolant and each of which are provided with vents or holes for discharging coolant towards the magnetic material.

2. A device as claimed in claim 1, characterized in that the other ends of the pipes are free and closed.

3. A device as claimed in claim 2, characterized in that the pipes converge from the connecting piece for the coolant.

4. A device as claimed in claim 1, further comprising a rod positioned within said holder and wherein said core comprises an elongated member of magnetic material mounted on said rod, and means for fastening said magnetic member to said rod comprising a retaining ring made of ceramic heat-resistant material.

5. Apparatus for welding together the edges of a longitudinally advancing metal tube to form a longitudinal seam, comprising closure means for bringing the edges of the tube together at a weld point, means for causing high frequency heating current to flow along the edges of said tube in the vicinity of said weld point, magnetic core means positioned within said advancing tube at a region near said weld point, a plurality of spaced tubes composed of non-magnetic material arranged within said advancing tube and surrounding at least a portion of said core means, and means for supplying a fluid coolant to said spaced tubes for passage therethrough, said spaced tubes being provided with a plurality of vents for discharging said coolant towards said magnetic core means.

6. Apparatus for welding a longitudinal seam in a metal tube, comprising means for longitudinally advancing the tube and bringing the edges together in a weld point, means for supplying high frequency heating current to said edges in the vicinity of said weld point, an elongated magnetic core member positioned within said advancing tube in the region of said weld point, a plurality of spaced pipes composed of non-magnetic material arranged in the form of a cage surrounding said core member, and means for supplying a fluid coolant to one end of said pipes for passage therethrough, said pipes being provided with a plurality of openings for discharging said coolant towards said magnetic core member.

7. Apparatus as described in claim 6 wherein said core member comprises a hollow cylindrical member extending in the general direction of advance of said tube, said apparatus further comprising a hollow tube coaxially positioned within said hollow magnetic member, said last-named hollow tube being connected at one end to said coolant supply means for passage of coolant therethrough and including a plurality of holes for discharging said coolant towards said magnetic core member.

8. Apparatus as described in claim 7 wherein the other end of said hollow tube is closed, said hollow tube and said hollow core member forming together a tubular passage for the flow of coolant discharged from said hollow tube.

9. Apparatus as described in claim 8 further comprising a retaining ring composed of a heat-resistant material mounted on said hollow tube near said closed end thereof, said retaining ring comprising at least one vent extending therethrough and communicating with said tubular passage for carrying off said coolant therein.

10. Apparatus for welding a longitudinal seam in a metal tube, comprising means for longitudinally advancing the tube and bringing the edges together in a weld point, means for supplying high frequency heating current to said edges in the vicinity of said weld point, a plurality of spaced pipes composed of non-magnetic material and arranged in the form of a cage coaxially positioned within said advancing tube, a cylindrical magnetic core member coaxially mounted within said cage in the region of said weld point, a container holding a fluid coolant located in advance of said weld point, said container comprising means for supporting said core member and said pipes at one end thereof, said container being provided with a plurality of outlet vents which communicate with said pipes for supplying coolant to said pipes for passage therethrough, each of said pipes being provided with a plurality of openings extending along a portion of its length dimension for discharging said coolant towards said magnetic core member.

11. Apparatus as described in claim 10 wherein said core member is hollow and further comprising a hollow tube coaxially positioned within said hollow core member to form therewith a tubular passage, said hollow tube having one end mounted on said container in registration with an outlet vent for supplying coolant to said hollow tube, said hollow tube including a plurality of vents for discharging said coolant into said tubular passage for cooling said magnetic core member.

References Cited by the Examiner

UNITED STATES PATENTS

| | | | |
|---|---|---|---|
| 2,833,910 | 5/58 | Stanton et al. | 219—59 |
| 3,028,469 | 4/62 | Bognar | 219—8.5 |
| 3,072,771 | 1/63 | Kennedy | 219—8.5 |

RICHARD M. WOOD, *Primary Examiner.*